US010100892B2

(12) United States Patent
Yabusaki et al.

(10) Patent No.: US 10,100,892 B2
(45) Date of Patent: Oct. 16, 2018

(54) ELECTRIC BRAKE CALIPER

(71) Applicant: TOYOTA JIDOSHA KABUSHIKI KAISHA, Toyota-shi, Aichi-ken (JP)

(72) Inventors: Naoki Yabusaki, Toyota (JP); Ryutaro Misumi, Toyota (JP); Nao Ikuma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/414,293

(22) Filed: Jan. 24, 2017

(65) Prior Publication Data

US 2017/0276197 A1    Sep. 28, 2017

(30) Foreign Application Priority Data

Mar. 24, 2016  (JP) ................... 2016-060471

(51) Int. Cl.
*F16D 125/40*    (2012.01)
*F16D 65/18*    (2006.01)
(Continued)

(52) U.S. Cl.
CPC ............ *F16D 65/18* (2013.01); *B60T 13/741* (2013.01); *F16D 55/226* (2013.01);
(Continued)

(58) Field of Classification Search
CPC .... F16D 55/226; F16D 65/0075; F16D 65/18; F16D 65/183; F16D 2066/003; F16D 2121/24; F16D 2125/34; F16D 2125/40; F16D 2125/50; F16D 2127/007; B60T 13/741
(Continued)

(56) References Cited

U.S. PATENT DOCUMENTS 4,804,073 A    2/1989  Taig et al.
6,315,086 B1   11/2001 Schmitt et al.
(Continued)

FOREIGN PATENT DOCUMENTS

JP    H03-500918 A    2/1991
JP    2000-110907 A   4/2000
(Continued)

*Primary Examiner* — Thomas W Irvin
(74) *Attorney, Agent, or Firm* — Oliff PLC

(57) ABSTRACT

An electric brake caliper, including: a caliper main body; brake pads; and an actuator including a piston, an electric motor of a rotary type, and a motion converting mechanism, wherein the motion converting mechanism includes a hollow output sleeve configured to be linearly moved to move the piston disposed at one end of the output sleeve nearer to the one of the brake pads and an input shaft disposed in the output sleeve and configured to be rotated by the electric motor, the motion converting mechanism being configured to convert rotation of the input shaft into a linear movement of the output sleeve, wherein the electric motor includes a hollow driving rotary shaft, and wherein the motion converting mechanism is disposed in the driving rotary shaft, and the input shaft includes a flange whose outer circumferential end is in mesh with an inner circumferential portion of the driving rotary shaft.

19 Claims, 2 Drawing Sheets

(51) Int. Cl.
  *F16D 55/226* (2006.01)
  *F16D 65/00* (2006.01)
  *B60T 13/74* (2006.01)
  *F16D 66/00* (2006.01)
  *F16D 121/24* (2012.01)
  *F16D 125/34* (2012.01)
  *F16D 125/50* (2012.01)
  *F16D 127/00* (2012.01)

(52) U.S. Cl.
  CPC ....... *F16D 65/0075* (2013.01); *F16D 65/183* (2013.01); *F16D 2066/003* (2013.01); *F16D 2121/24* (2013.01); *F16D 2125/34* (2013.01); *F16D 2125/40* (2013.01); *F16D 2125/50* (2013.01); *F16D 2127/007* (2013.01)

(58) Field of Classification Search
  USPC ....................................................... 188/72.8
  See application file for complete search history.

(56) References Cited

U.S. PATENT DOCUMENTS

| | | | | |
|---|---|---|---|---|
| 6,889,800 | B2* | 5/2005 | Halasy-Wimmer | F16D 65/18 188/162 |
| 7,273,134 | B2* | 9/2007 | Schack | F16D 55/226 188/1.11 R |
| 7,316,300 | B2* | 1/2008 | Danne | F16D 55/00 188/162 |
| 8,136,641 | B2* | 3/2012 | Wang | F16D 65/18 188/158 |
| 8,579,090 | B2* | 11/2013 | Yamasaki | F16D 65/18 188/162 |
| 8,596,426 | B2* | 12/2013 | Yamasaki | F16D 65/18 188/156 |
| 9,217,479 | B2* | 12/2015 | Masuda | F16D 65/18 |
| 9,435,411 | B2* | 9/2016 | Eguchi | F16H 25/2266 |
| 10,030,730 | B2* | 7/2018 | Yabusaki | F16D 66/026 |
| 2004/0200676 | A1* | 10/2004 | Chang | F16D 55/36 188/72.8 |
| 2006/0102438 | A1* | 5/2006 | Bayer | B60T 13/741 188/156 |
| 2008/0196529 | A1 | 8/2008 | Sugitani | |
| 2014/0000993 | A1* | 1/2014 | No | F16D 55/226 188/72.8 |
| 2016/0032994 | A1* | 2/2016 | Sakashita | F16D 55/225 188/72.3 |
| 2016/0201777 | A1* | 7/2016 | Yamasaki | F16D 65/18 188/72.1 |
| 2017/0066428 | A1* | 3/2017 | Masuda | B60T 13/74 |
| 2017/0166178 | A1* | 6/2017 | Masuda | B60T 8/58 |

FOREIGN PATENT DOCUMENTS

| | | |
|---|---|---|
| JP | 2001516859 A | 10/2001 |
| JP | 2005-133863 A | 5/2005 |
| JP | 4186969 B2 | 11/2008 |
| JP | 2014109315 A | 6/2014 |
| WO | 2014-084375 A1 | 6/2014 |

\* cited by examiner

ELECTRIC BRAKE CALIPER

CROSS REFERENCE TO RELATED APPLICATION

The present application claims priority from Japanese Patent Application No. 2016-060471, which was filed on Mar. 24, 2016, the disclosure of which is herein incorporated by reference in its entirety.

BACKGROUND

Technical Field

The following disclosure relates to an electric brake caliper configured to give a braking force to a wheel by a power of an electric motor.

Description of Related Art

A caliper, such as an electric brake caliper disclosed in WO2014/084375A1, is known. In the disclosed caliper, an axis of an electric motor is parallel with and spaced from an axis of a caliper, namely, a center axis of a piston configured to push brake pads as friction members. Thus, the caliper is relatively large in size. In an electric brake caliper disclosed in JP-A-2005-133863, an axis of the caliper and an axis of an electric motor coincide with each other. In other words, a motion converting mechanism configured to convert rotation of the electric motor into a linear movement of a piston is disposed in an inner space of a hollow cylindrical driving rotary shaft of the electric motor. Thus, the caliper is relatively compact in size.

SUMMARY

The motion converting mechanism of the electric brake caliper disclosed in JP-A-2005-133863 is configured such that an outer sleeve having a relatively large diameter is drivingly rotated so as to linearly move a shaft disposed in the outer sleeve and having a relatively small diameter. In this configuration, the inertia with respect to rotation of the outer sleeve is large. Consequently, the disclosed caliper is not necessarily satisfactory for ensuring a smooth operation of the caliper. Electric brake calipers which are under development have much room for improvement. Thus, the utility of electric brake calipers can be enhanced by various modifications. An aspect of the disclosure provides an electric brake caliper having high utility.

In one aspect of the disclosure, an electric brake caliper includes:
a caliper main body;
a pair of brake pads held by the caliper main body such that the brake pads face each other with a disc rotor interposed therebetween, the disc rotor being configured to rotate with a wheel; and
an actuator held by the caliper main body and including (A) a piston, (B) an electric motor of a rotary type as a drive source, and (C) a motion converting mechanism to move the piston by rotation of the electric motor, the actuator being configured to move one of the brake pads toward the other of the brake pads,
wherein the motion converting mechanism includes (a) an output sleeve having a hollow cylindrical shape and configured to be linearly moved to move the piston in an axial direction in which an axis of the motion converting mechanism extends, the piston being disposed at one of opposite ends of the output sleeve that is nearer to the one of the brake pads, and (b) an input shaft disposed in the output sleeve along the axis and configured to be rotated by the electric motor, the motion converting mechanism being configured to convert rotation of the input shaft into a linear movement of the output sleeve,
wherein the electric motor includes a driving rotary shaft having a hollow cylindrical shape, and
wherein the motion converting mechanism is disposed in an inner space of the driving rotary shaft, and the input shaft includes a flange whose outer circumferential end is in mesh with an inner circumferential portion of the driving rotary shaft.

According to the electric brake caliper constructed as described above, the motion converting mechanism is disposed in the inner space of the driving rotary shaft of the electric motor, so that the electric brake caliper is compact in size. Further, the motion converting mechanism is configured to rotate the input shaft having a relatively small diameter. Consequently, the inertia described above is small, so that a smooth operation of the caliper is ensured.

FORMS OF THE INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and an embodiment. It is to be further understood that, as long as the claimable invention is construed in this way, any form in which one or more constituent elements is/are added to or deleted from any one of the following forms may be considered as one form of the claimable invention.

In the following forms, the form (1) corresponds to claim 1. The form (4) corresponds to claim 2. A combination of the forms (5) and (6) corresponds to claim 3. The form (7) corresponds to claim 4. The form (8) corresponds to claim 5. The form (10) corresponds to claim 6. The form (12) corresponds to claim 7. The form (14) corresponds to claim 8. The form (16) corresponds to claim 9. The form (17) corresponds to claim 10.

(1) An electric brake caliper, comprising:
a caliper main body;
a pair of brake pads held by the caliper main body such that the brake pads face each other with a disc rotor interposed therebetween, the disc rotor being configured to rotate with a wheel; and
an actuator held by the caliper main body and including (A) a piston, (B) an electric motor of a rotary type as a drive source, and (C) a motion converting mechanism to move the piston by rotation of the electric motor, the actuator being configured to move one of the brake pads toward the other of the brake pads,
wherein the motion converting mechanism includes (a) an output sleeve having a hollow cylindrical shape and configured to be linearly moved to move the piston in an axial direction in which an axis of the motion converting mechanism extends, the piston being disposed at one of opposite ends of the output sleeve that is nearer to the one of the brake pads, and (b) an input shaft disposed in the output sleeve along the axis and configured to be rotated by the electric motor, the motion converting mechanism being configured to convert rotation of the input shaft into a linear movement of the output sleeve, wherein the electric motor includes a driving rotary shaft having a hollow cylindrical shape, and wherein the motion converting mechanism is disposed in an inner space of the driving rotary shaft, and the input shaft includes a flange whose outer circumferential end is in mesh with an inner circumferential portion of the driving rotary shaft.

According to the electric brake caliper constructed as described above, the motion converting mechanism is disposed in the inner space of the hollow cylindrical driving rotary shaft. In short, at least a part of the motion converting mechanism is disposed in the inner space of the driving rotary shaft such that the axis of the motion converting mechanism coincides with the axis of the driving rotary shaft. Consequently, the electric caliper is relatively compact in size. Moreover, the input shaft disposed in the output sleeve, namely, the shaft having a relatively small diameter, is drivingly rotated, so that the inertia in the electric brake caliper is small, and a smooth operation of the electric brake caliper is ensured.

In terms of simplification of the structure, an axis of the input shaft and an axis of the output sleeve may coincide with the axis of the motion converting mechanism. Further, the axis of the motion converting mechanism may coincide with an axis of the electric motor, namely, an axis of the driving rotary shaft. In terms of a reduction in the size, it is desirable that the motion converting mechanism be disposed in the inner space of the driving rotary shaft of the electric motor as much as possible, in other words, it is desirable that most portion of the motion converting mechanism be disposed in the inner space of the driving rotary shaft.

In the following explanation, a movement of the piston in a direction in which the one of the brake pads is brought near to the other of the brake pads by the piston and a movement of the output sleeve to cause the movement of the piston are each referred to as an advancing movement. Further, a movement of the piston when the one of the brake pads is separated away from the other of the brake pads and a movement of the output sleeve to cause the movement of the piston are each referred to as a retracting movement. In this connection, directions with regard to the electric brake caliper, portions of constituent elements of the electric brake caliper, and locations of the constituent elements are represented by using the following terms "forward", "rearward", "front portion", "rear portion", "front side", "rear side", etc. In the present electric brake caliper, the piston may be mounted on the output sleeve. Further, the piston and the output sleeve may be formed integrally with each other.

(2) The electric brake caliper according to the form (1), wherein the flange of the input shaft of the motion converting mechanism is disposed apart from the other of the opposite ends of the output sleeve in the axial direction.

The flange extends radially from a body of the input shaft so as to reach the inner circumferential portion of the driving rotary shaft of the electric motor. It is required that the flange should not interfere with the output sleeve disposed between the input shaft and the driving rotary shaft. In the present electric brake caliper, the flange of the input shaft is disposed on the rear side of the output sleeve. For reducing the size in the axial direction, the rear end of the output sleeve is desirably located as close as possible to the flange when the output sleeve is located at its retracted end position. It is further desirable that the flange be disposed at the rear end portion of the input shaft and that the flange be in mesh with the inner circumferential portion of the rear end portion of the driving rotary shaft.

(3) The electric brake caliper according to the form (1) or (2), wherein the electric motor includes magnets and coils that face one another, one of the magnets and the coils being provided on an outer circumferential portion of the driving rotary shaft while the other of the magnets and the coils being fixed to the caliper main body.

This form includes a limitation as to the concrete structure of the electric motor. According to this form, the driving rotary shaft itself functions as a rotor. To enjoy an advantage of absence of brushes, it is desirable to provide the magnets on the outer circumferential portion of the driving rotary shaft and to provide the coils, each as a stator, radially outwardly of the magnets, such that the magnets and the coils face one another.

(4) The electric brake caliper according to any one of the forms (1)-(3), wherein the input shaft is rotatably supported by the caliper main body to permit the motion converting mechanism to receive a counterforce from the one of the brake pads.

The counterforce caused when the brake pads are pressed onto the disc rotor needs to be received by the caliper main body via the motion converting mechanism. According to this form, the counterforce is received by the caliper main body through the input shaft of the motion converting mechanism. In this form, the input shaft is supported by the caliper main body. This means not only that the input shaft is directly supported by the caliper main body, but also that the input shaft is indirectly supported by the caliper main body. For instance, the input shaft may be indirectly supported by the caliper main body with a suitable member, such as a bearing (which will be explained), interposed therebetween. Further, in an instance where the actuator includes the housing, the input shaft may be supported by the caliper main body such that the input shaft is supported by the housing and the housing is in turn supported by the caliper main body.

(5) The electric brake caliper according to the form (4), wherein the input shaft is rotatably supported by the caliper main body at the flange.

According to this form, the input shaft is supported by the caliper main body at a portion having a relatively large diameter, so that the counterforce is received over a relatively large area.

(6) The electric brake caliper according to the form (4) or (5), wherein the input shaft is supported by the caliper main body through a thrust bearing.

According to this form, the input shaft is supported by the caliper main body in a state in which the input shaft is smoothly rotatable owing to the thrust bearing.

(7) The electric brake caliper according to any one of the forms (1)-(6), further comprising an inclination allowing mechanism configured to allow inclination of the motion converting mechanism so as to allow inclination of the axis.

The brake pads may be unevenly worn. That is, each brake pad may wear to a greater extent at one of upper and lower portions thereof or right and left portions thereof than at the other of those portions. In this form, the motion converting mechanism is allowed to incline to some extent. Even when the brake pad is unevenly worn, the motion converting mechanism does not receive an undesirable stress and the electric brake caliper generates a sufficient braking force.

(8) The electric brake caliper according to the form (7),
wherein, when the axis is not inclined, the inner circumferential portion of the driving rotary shaft is in mesh with the outer circumferential end of the flange of the input shaft over a certain width in the axial direction at a plurality of locations on one circumference, and
wherein the inclination allowing mechanism is configured such that a center of the inclination of the motion converting mechanism is located within the certain width.

The rotation of the driving rotary shaft of the electric motor is transmitted to the input shaft through meshing between the outer circumferential end of the flange and the inner circumferential portion of the driving rotary shaft. In the meantime, when the motion converting mechanism is allowed to incline by the inclination allowing mechanism, the flange of the input shaft also inclines. In this form, when the flange inclines as a result of inclination of the motion converting mechanism, an amount of displacement of the flange in a direction perpendicular to the axis of the electric motor, namely, perpendicular to the axis of the driving rotary shaft, is small. It is thus possible to simplify a structure of meshing between the inner circumferential portion of the driving rotary shaft and the outer circumferential end of the flange (hereinafter simply referred to as "meshing structure") that allows inclination of the motion converting mechanism while enabling transmission of the rotation of the driving rotary shaft to the input shaft.

(9) The electric brake caliper according to the form (8), wherein the inclination allowing mechanism is configured such that the center of the inclination of the motion converting mechanism is located within a thickness range of the flange in the axial direction.

This form is effective for simplifying the meshing structure described above when the flange takes a posture perpendicular to the axis of the motion converting mechanism, namely, perpendicular to the axis of the input shaft.

(10) The electric brake caliper according to any one of the forms (7)-(9), wherein a meshing structure between the outer circumferential end of the flange and the inner circumferential portion of the driving rotary shaft enables rotation of the driving rotary shaft to be transmitted to the flange while permitting a displacement of the flange caused by the inclination of the motion converting mechanism.

According to this form, even when the motion converting mechanism inclines, the rotation of the driving rotary shaft of the electric motor is transmitted to the input shaft with high reliability.

(11) The electric brake caliper according to the form (10), wherein the meshing structure between the outer circumferential end of the flange and the inner circumferential portion of the driving rotary shaft includes spline engagement that permits a relative displacement of the outer circumferential end of the flange and the inner circumferential portion of the driving rotary shaft in the axial direction.

This form is one concrete example of the simple meshing structure described above. This form easily permits the relative displacement of the inner circumferential portion of the driving rotary shaft and the outer circumferential end of the flange at respective meshing positions on a plane on which the axis of the motion converting mechanism moves when it inclines. (This plane will be hereinafter referred to as "inclination plane" where appropriate.) With consideration given to the fact that the relative displacement needs to be permitted at other meshing positions not located on the inclination plane, it is desirable to provide a clearance having a certain size in the circumferential direction, between the inner circumferential portion of the driving rotary shaft and the outer circumferential end of the flange.

(12) The electric brake caliper according to any one of the forms (7)-(11),
wherein the inclination allowing mechanism includes: a seat member which is fixed to the caliper main body and which includes a seat surface recessed so as to define a part of a spherical surface; and a slide member which supports the input shaft and which slides on the seat surface, and
wherein a center of the spherical surface coincides with a center of the inclination of the motion converting mechanism.

In a state in which the input shaft of the motion converting mechanism is supported by the caliper main body, it is possible to easily determine the center of the inclination of the motion converting mechanism allowed by the inclination allowing mechanism. In other words, the center of the inclination is set to a given position by suitably setting the spherical surface. The seat member may be directly fixed to the caliper main body or may be indirectly fixed to the caliper main body via another member such as the housing of the actuator.

(13) The electric brake caliper according to the form (12), wherein the slide member supports the input shaft at the flange.

According to this form, the slide member receives the counterforce over a relatively large area while the inclination of the motion converting mechanism is allowed.

(14) The electric brake caliper according to any one of the forms (1)-(13), wherein the actuator includes a housing in which the electric motor and the motion converting mechanism are housed, the housing being separably fixed to the caliper main body such that the actuator inclusive of the housing is separably held by the caliper main body.

According to this form, the actuator is separable or removable from the caliper main body. This configuration is convenient in performing maintenance, for instance. In an instance where the actuator is configured to be held by the caliper main body utilizing fastening members such as bolts, the actuator is easily removed from the caliper main body.

(15) The electric brake caliper according to the form (14), wherein the input shaft is rotatably supported by the housing to permit the motion converting mechanism to receive a counterforce from the one of the brake pads, and the housing is supported by the caliper main body to permit the caliper main body to receive the counterforce.

This form is one example of the above-indicated form in which the counterforce is indirectly received by the caliper main body.

(16) The electric brake caliper according to the form (15), wherein the housing includes a stepped surface and the caliper main body includes a stepped surface that face each other, the counterforce being received by the caliper main body via the stepped surfaces.

According to this form, the counterforce from the one of the brake pads is suitably received by the caliper main body utilizing the stepped surfaces.

(17) The electric brake caliper according to any one of the forms (1)-(16),
wherein the motion converting mechanism includes a plurality of planetary rollers disposed between an outer circumference of the input shaft and an inner circumference of the output sleeve such that the planetary rollers extend in the axial direction and are revolvable about the input shaft, and wherein threads are formed on the outer circumference of the input shaft, the inner circumference of the output sleeve, and an outer circumference of each of the planetary rollers, and wherein the thread of the input shaft and the thread of each of the planetary rollers are engaged with each other, and the thread of the output sleeve and the thread of each of the planetary rollers are engaged with each other.

Though the motion converting mechanism of the present electric brake caliper may have any known structure, the structure of the motion converting mechanism is limited, in this form, to a particular one. That is, the motion converting mechanism of this form is equipped with a speed reducer of the so-called planetary roller type. The electric brake caliper that employs the motion converting mechanism is compact in size, and the amount of advancing movement of the output sleeve per one rotation of the input shaft is made relatively small. Moreover, in the motion converting mechanism, a difference between positive efficiency (forward efficiency) and negative efficiency (reverse efficiency) can be made large, so that this form enables employment of a small-sized high-speed low-torque motor as the electric motor functioning as a drive source. Further, it is possible to control, with high accuracy, the amount of the advancing movement of the piston, namely, the pressing force by the brake pads with respect to the disc rotor.

The motion converting mechanism employed in this form may have any known structure. For instance, a mechanism described in JP-A-2005-133863 may be employed as the motion converting mechanism. Specifically, a thread is formed on the outer circumference of the input shaft, a thread is formed on the outer circumference of each of the planetary rollers, and a thread is formed on the inner circumference of the output sleeve. The thread of the input shaft and the thread of each planetary roller which are formed at the same pitch and in mutually opposite helical directions are held in engagement with each other. The thread of each planetary roller and the thread of the output sleeve which are formed at the same pitch and in mutually the same helical direction are held in engagement with each other. In the meantime, there is a relationship of the pitch diameter and the number of threads under which the input shaft, the planetary rollers, and the output sleeve do not displace relative to each other in the axial direction even if the input shaft is rotated in a state in which the outer sleeve is prohibited from rotating. By increasing or decreasing the number of threads of the input shaft or the output sleeve with respect to the number of threads in the relationship, the motion converting mechanism that is employable is formed.

A motion converting mechanism described in Japanese Patent No. 4186969 may be employed. In the motion converting mechanism, mutually engaging teeth are formed on the input shaft, the planetary rollers, and the output sleeve. The thus configured motion converting mechanism enables the amount of the advancing movement of the piston to be controlled with a higher accuracy. In the motion converting mechanism, a threaded region and a toothed region may be divided from each other in the axial direction. Alternatively, the thread and the teeth may be formed in the same area so as to provide a texture.

(18) The electric brake caliper according to the form (17), wherein the output sleeve has an opening at the one of the opposite ends thereof, and the piston is attached to the output sleeve so as to close the opening.

According to this form, assembling of the motion converting mechanism, namely, assembling of the planetary rollers and the input shaft to the output sleeve, is easily performed in a state in which the output sleeve is kept open at the one of the opposite ends thereof. Thereafter, the piston is attached to the output sleeve so as to close the opening of the output sleeve. Thus, this form enables easy manufacture of the electric brake caliper.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Figure 1:
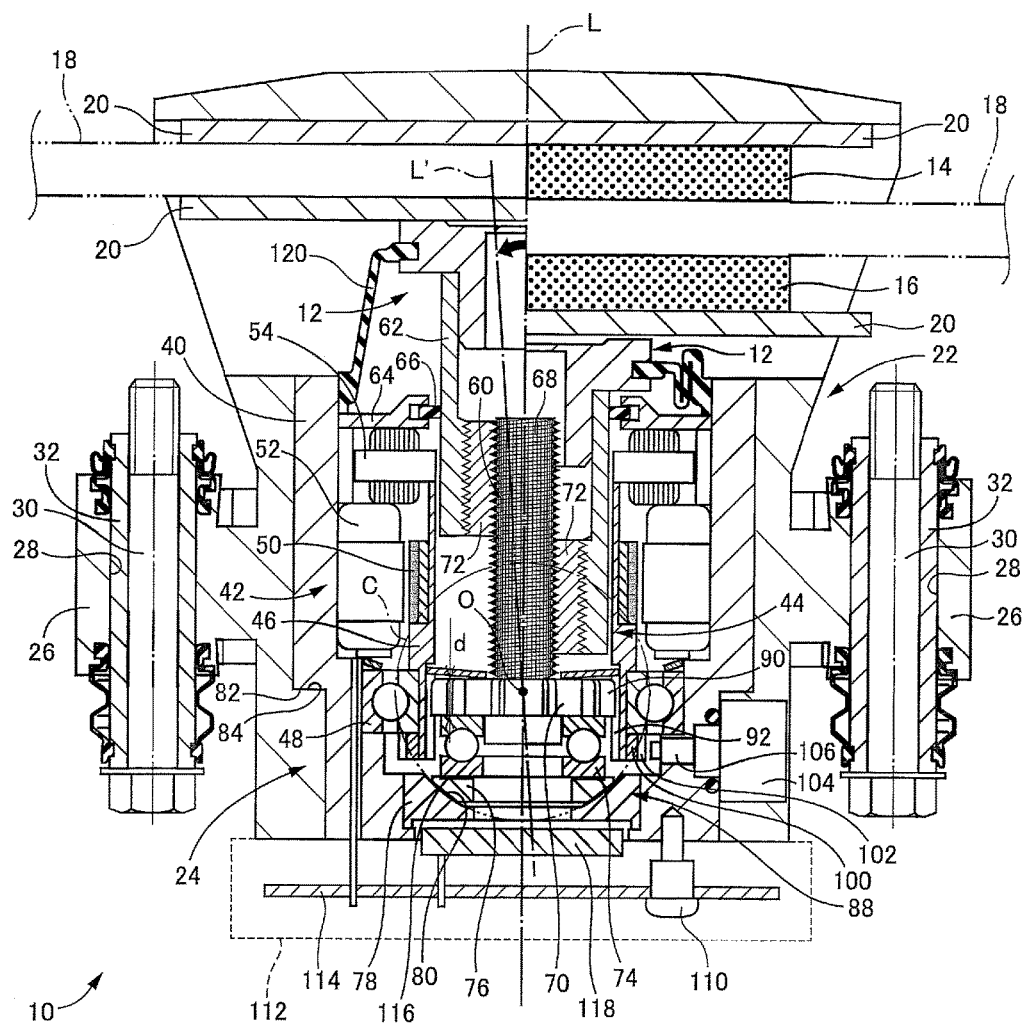
FIG. 1 is a cross-sectional view schematically showing an electric brake caliper according to one embodiment.

Referring to the drawings, there will be explained below in detail one embodiment of the claimable invention. It is to be understood that the claimable invention is not limited to the details of the following embodiment and the forms described in Forms of the Invention, but may be changed and modified based on the knowledge of those skilled in the art.

An electric brake caliper 10 according to one embodiment of the claimable invention is configured to give a braking force (a wheel braking force) to a wheel of a vehicle. FIG. 1 schematically shows a cross section of the electric brake caliper as viewed from one side of the wheel on which an axle is located. For the sake of convenience, directions relating to the electric brake caliper 10 will be defined as follows. The upper side, the lower side, the right side, and the left side in FIG. 1 are respectively referred to as a front side, a rear side, a right, side, and a left side of the electric brake caliper 10. In an actual vehicle, the front side corresponds to a direction away from a center of a vehicle body in a vehicle width direction while the rear side corresponds to a direction toward the center of the vehicle body in the vehicle width direction.

The right half portion of FIG. 1 shows a state in which a piston 12 is retracted and a pair of brake pads 14, 16 are not pressed onto a disc rotor 18. The brake pads 14, 16 shown in the right half portion of FIG. 1 are almost not worn. In contrast, the brake pads 14, 16 shown in the left half portion of FIG. 1 are nearly totally worn. The left half portion of FIG. 1 shows a state in which the piston 12 is advanced and backup plates 20, 20, which shave supported the respective brake pads 14, 16, directly hold the disc rotor 18 therebetween.

As shown in FIG. 1, the electric brake caliper 10 includes a caliper main body 22, the pair of brake pads 14, 16 held by the caliper main body 22 so as to be movable in a front-rear direction, and an actuator 24 held by the caliper main body 22.

The brake pads 14, 16 are disposed so as to be opposed to each other, such that the disc rotor 18 configured to rotate with the wheel is sandwiched therebetween in the front-rear direction. The caliper main body 22 is provided with a pair of slides 26. Each of the slides 26 has a through-hole 28 that extends in the front-rear direction. A pair of guide pipes 32 are fitted in the respective through-holes 28 of the slides 26. Each guide pipe 32 is fixed, via a bolt 30, to a carrier (not shown) that rotatably holds the wheel. Each guide pipe 32 extends in the front-rear direction, and guides a corresponding one of the slides 26, so that the caliper main body 22, namely, the electric brake caliper 10 itself, is supported by the carrier so as to be movable in the front-rear direction.

The actuator 24 includes a cylindrical housing 40. The actuator 24 is supported at its housing 40 by the caliper main body 22. The actuator 24 has a function of moving the rear-side brake pad 16 toward the front-side brake pad 14. The actuator 24 includes: the piston 12 that is engageable with the backup plate 20 that supports the rear-side brake pad 16; an electric motor 42 of a rotary type, as a drive source; and a motion converting mechanism 44 configured to move the piston 12 by rotation of the electric motor 42. An axis L of the motion converting mechanism 44 coincides with an axis of the electric brake caliper 10 and an axis of the electric motor 42.

The electric motor 42 includes a driving rotary shaft 46, as a motor shaft, which has a hollow cylindrical shape and which is configured to drive the motion converting mechanism 44 and the piston 12. An axis of the driving rotary shaft 46 is the axis of the electric motor 42. The driving rotary shaft 46 is supported by the housing 40 through a radial bearing 48 so as to be rotatable about the axis L and so as to be immovable in axial direction in which the axis L extends. A plurality of magnets 50 are provided on an outer circumferential portion of the driving rotary shaft 46. A plurality of coils 52 are fixed to an inner circumferential portion of the housing 40 on one circumference such that the coils 52 face the magnets 50. In the electric motor 42, the driving rotary shaft 46 and the magnets 50 function as rotors, and the coils 52 functions as stators. That is, the electric motor 42 is a brushless servo motor. A resolver 54 fixed to the housing 40 is configured to detect a rotation angle of the electric motor 42, i.e., a rotation angle of the driving rotary shaft 46. Based on the detected rotation angle, the electric motor 42 is controlled.

The motion converting mechanism 44 includes: an input shaft 60 configured to be drivingly rotated by the electric motor 42; and an output sleeve 62 having a hollow cylindrical shape and configured to be linearly moved in the axial direction by rotation of the input shaft 60. The output sleeve 62 is held in engagement with a lid 64 of the housing 40 via a seal 66, at the outer circumferential portion of the output sleeve 62. The lid 64 is a generally doughnut-shaped plate. The lid 64 has an inner diameter somewhat larger than an outer diameter of the output sleeve 62, and the seal 66 is relatively loose, whereby a displacement of the output sleeve 62 in the radial direction is allowed to a certain extent. It is noted that the output sleeve 62 is prohibited from rotating about the axis L by a rotation prohibiting mechanism not shown. The piston 12 is attached to a front end portion of the output sleeve 62 so as to be fitted in the output sleeve 62.

The input shaft 60 disposed in the output sleeve 62 along the axis L includes: a shaft portion 68; and a flange portion 70 formed at a rear end portion of the shaft portion 68 and functioning as a flange. A plurality of planetary rollers 72 are disposed between an outer circumference of the shaft portion 68 and an inner circumference of the output sleeve 62 such that the planetary rollers 72 extend in the axial direction and are revolvable about the shaft portion 68, i.e., the input shaft 60. While not shown, the planetary rollers 72 are held by a carrier that is supported by the output sleeve 62, such that each planetary roller 72 is rotatable and immovable in the axial direction relative to the output sleeve 62 while relative positions of the planetary rollers 72 are maintained.

The motion converting mechanism 44 that includes the input shaft 60, the output sleeve 62, and the planetary rollers 72 has a known structure. Specifically, the motion converting mechanism 44 has a structure shown in FIG. 14 of Japanese Patent No. 4186969. A thread is formed on the outer circumference of the shaft portion 68 of the input shaft 60, a thread is formed on the inner circumference of the output sleeve 62, and a thread is formed on the outer circumference of each planetary roller 72. The threads are formed at the same pitch. The thread of the input shaft 60 and the thread of each planetary roller 72 are formed in mutually opposite helical directions and are held in engagement with each other. The thread of each planetary roller 72 and the thread of the output sleeve 62 are formed in mutually the same helical direction and are held in engagement with each other. Further, mutually meshing teeth are formed at the threaded region of each of the outer circumference of the shaft portion 68 of the input shaft 60, the inner circumference of the output sleeve 62, and the other circumference of each planetary roller 72. That is, the threads and the teeth are formed on the outer circumference of the shaft portion 68 of the input shaft 60, the inner circumference of the output sleeve 62, and the outer circumference of each planetary roller 72, so as to provide a texture.

It is noted that there is a relationship of the pitch diameter and the number of threads under which the input shaft 60, the planetary rollers 72, and the output sleeve 62 do not displace relative to each other in the axial direction even if the input shaft 60 is rotated in a state in which the output sleeve 62 is prohibited from rotating. In the present embodiment, the number of threads formed on the input shaft 60 or the output sleeve 62 is increased or decreased with respect to the number of threads in the relationship. Consequently, when the input shaft 60 is rotated, the output sleeve 62 moves in the axial direction in accordance with the rotation of the input shaft 60. Owing to this action, the motion converting mechanism 44 converts the rotation of the input shaft 60 into a linear movement of the output sleeve 62.

The thus constructed motion converting mechanism 44 has a speed reducer of the so-called planetary roller type. Owing to the speed reducer, the amount of the linear movement of the output sleeve 62 per one rotation of the input shaft 60 is relatively small, and a difference between positive efficiency (forward efficiency) and negative efficiency (reverse efficiency) is considerably large. Thus, a small-sized high-speed low-torque motor is employed as the electric motor 42, resulting in a size reduction of the electric brake caliper 10. Further, it is possible to control, with high accuracy, the amount of the advancing movement of the piston 12, namely, the pressing force by the brake pads 14, 16 with respect to the disc rotor 18.

The piston 12 is attached to the output sleeve 62 so as to close an opening formed at a front end of the output sleeve 62. In the present embodiment, assembling of the motion converting mechanism 44, namely, assembling of the planetary rollers 72 and the input shaft 60 to the output sleeve 62, can be easily performed with the front end of the output sleeve 62 kept open, and the piston 12 can be thereafter attached to the front end of the output sleeve 62. Thus, this arrangement is advantageous in manufacturing the electric brake caliper 10.

The input shaft 60 is supported at the flange portion 70 by the housing 40. The piston 12, namely, the motion converting mechanism 44, receives a counterforce against a force applied by the brake pad 16 to press the disc rotor 18 when the braking force is generated. In the present electric brake caliper 10, the counterforce is received by the housing 40 via the input shaft 60 and is received by the caliper main body 22 via the housing 40. Consequently, the electric brake caliper 10 has a support structure for rotatably supporting the input shaft 60.

The support structure is configured as follows. The input shaft 60 is supported at the flange portion 70. Specifically, the flange portion 70 is supported by the housing 40 via a thrust bearing 74, a slide member 76, and a seat member 78. The seat member 78 is fixed to the rear end portion of the housing 40 such that the rear end portion of the housing 40 holds the seat member 78. The seat member 78 has, on its front side, a seat surface 80 that is recessed so as to define a part of a spherical surface C. The slide member 76 is swingable in the radial direction such that the slide member 76 is held in sliding contact with the seat surface 80. The thrust bearing 74 is sandwiched by and between a front-side surface of the slide member 76 and a rear-side surface of the flange portion 70.

According to the thus constructed support structure in which the input shaft 60 is supported at the flange portion 70, the slide member 76 receives the counterforce from the brake pad 16 over a relatively large area. In other words, the input shaft 60 is supported by a portion having a relatively large diameter, so that the counterforce is distributed over the relatively large area.

In the present electric brake caliper 10, a stepped surface 82 is formed on the outer circumferential portion of the housing 40 while a stepped surface 84 is formed on the caliper main body 22 which are held in engagement with each other. In this arrangement, the counterforce from the housing 40 is effectively received by the caliper main body 22 via the mutually facing stepped surfaces 82, 84.

As described above, the slide member 76 is swingably supported by the seat member 78, whereby the input shaft 60 is allowed to incline. That is, the motion converting mechanism 44, inclusive of the piston 12 and the output sleeve 62, is allowed to incline. Thus, the present electric brake caliper 10 has an inclination allowing mechanism 88 that includes the seat member 78, the slide member 76, and so on. FIG. 1 shows an axis L' of the motion converting mechanism 44 that is changed from the axis L in an instance where the motion converting mechanism 44 is allowed to be inclined by the inclination allowing mechanism 88 such that the front end of the motion converting mechanism 44 is directed leftward.

The brake pads 14, 16 may be unevenly worn. Specifically, each of the brake pads 14, 16 may wear to a greater extent at one side thereof in the up-down direction or in the right-left direction than at the other side. That is, the brake pads 14, 16 may suffer from the so-called uneven wear. The inclination allowing mechanism 88 is an effective means to deal with the uneven wear. That is, the electric brake caliper generates a sufficient braking force without a risk that the motion converting mechanism 44 may receive an undesirable stress.

The rotation of the driving rotary shaft 46 of the electric motor 42 is transmitted to the input shaft 60 as follows. The outer circumferential end of the flange portion 70 of the input shaft 60 is in mesh with the inner circumferential portion of the driving rotary shaft 46, and the rotation is transmitted through the meshing. Specifically, a plurality of protrusions 90 are formed on the outer circumferential end of the flange portion 70 at an equal angular pitch. Each protrusion 90 extends in the axial direction over a distance corresponding to the thickness of the flange portion 70. A plurality of grooves 92, each of which extends in the axial direction, are formed on the inner circumferential portion of the driving rotary shaft 46 at an equal angular pitch, so as to correspond to the plurality of protrusions 90. The protrusions 90 and the grooves 92 are in mesh with each other, whereby the inner circumferential portion of the driving rotary shaft 46 and the outer circumferential end of the flange portion 70 are in mesh with each other over a certain width d corresponding to the thickness d of the flange portion 70 at a plurality of locations on one circumference. Thus, the rotation of the driving rotary shaft 46 of the electric motor 42 is transmitted to the input shaft 60.

When the motion converting mechanism 44 is allowed to incline by the inclination allowing mechanism 88, the flange portion 70 which is perpendicular to the shaft portion 68 also inclines in accordance with the inclination of the input shaft 60. The rotation needs to be properly transmitted with consideration given to the inclination of the flange portion 70.

In an instance where the center of the inclination of the motion converting mechanism 44 by the inclination allowing mechanism 88 is largely spaced forward or rearward from the flange portion 70, the flange portion 70 itself is displaced in a direction perpendicular to the axial direction in accordance with the inclination. In this instance, a distance between the outer circumferential end of the flange portion 70 and the inner circumferential portion of the driving rotary shaft 46 that are in mesh with each other largely changes on the inclination plane on which the axis L moves. Consequently, the mechanism that enables the rotation to be properly transmitted upon inclination undesirably becomes complicated.

In the present electric brake caliper 10, therefore, the center O of the inclination is located within the width d in the axial direction in a state in which the motion converting mechanism 44, namely, the axis L, is not inclined. In other words, the center O of the inclination is located within the thickness range d of the flange portion 70 in the axial direction. Specifically, the spherical surface C is set and the seat member 78 is positioned such that the center of the spherical surface C that defines the seat surface 80 of the seat member 78 coincides with the center O of the inclination. The inclination allowing mechanism 88 is thus structured.

Owing to the structure of the inclination allowing mechanism 88, the outer circumferential end of the flange portion 70 is displaced substantially in the axial direction when the motion converting mechanism 44 inclines, and the distance in the radial direction between the outer circumferential end of the flange portion 70 and the inner circumferential portion of the driving rotary shaft 46 which are in mesh with each other does not almost change. It is thus possible to simplify the mechanism that enables the rotation to be properly transmitted even when the motion converting mechanism 44 inclines. Specifically, the mechanism is constituted such that the protrusions 90 of the flange portion 70 are permitted to be moved in the axial direction within the corresponding grooves 92 formed on the inner circumferential portion of the driving rotary shaft 46. In view of this, the meshing structure is provided by spline engagement that permits a relative displacement of the outer circumferential end of the flange portion 70 and the inner circumferential portion of the driving rotary shaft 46 in the axial direction. As explained above, the meshing structure between the outer circumferential end of the flange portion 70 and the inner circumferential portion of the driving rotary shaft 46 enables the rotation of the driving rotary shaft 46 to be transmitted to the flange portion 70 while permitting the displacement of the flange portion 70 caused by the inclination of the motion converting mechanism 44.

At meshing positions not located on the inclination plane, each protrusion 90 inclines in the corresponding groove 92. In view of this, a suitable clearance is provided in the circumferential direction between the side surface of each protrusion 90 and the axially extending side surface of each groove 92.

In the present electric brake caliper 10, the motion converting mechanism 44 is disposed in the inner space of the cylindrical driving rotary shaft 46. In other words, as apparent from the state in which the output sleeve 62 is located at its retracted end position (i.e., the state indicated in the right half portion in FIG. 1), most portion of the motion converting mechanism 44 is disposed in the electric motor 42 such that the motion converting mechanism 44 is coaxial with the electric motor 42. Thus, the present electric brake caliper 10 is relatively compact in size. The flange portion 70 of the input shaft 60 radially extends from the shaft portion 68 to the inner circumferential portion of the driving rotary shaft 46 of the electric motor 42, and is disposed on the rear side of the output sleeve 62 for avoiding an interference with the output sleeve 62 that is disposed between the input shaft 60 and the driving rotary shaft 46. In the present electric caliper 10, the rear end of the output sleeve 62 is located near to the flange portion 70 when the output sleeve 62 is located at its retracted end. Further, the flange portion 70 is provided at the rear end portion of the input shaft 60 and is in mesh with the inner circumferential portion of the rear end portion of the driving rotary shaft 46. Thus, the electric brake caliper 10 is made compact in the axial direction.

Unlike the conventional arrangement in which a shaft (corresponding to the input shaft 60) disposed in an outer sleeve (corresponding to the output sleeve 62) is linearly moved by rotating the outer sleeve, the motion converting mechanism 44 of the present electric brake caliper 10 is configured such that the input shaft 60 disposed in the output sleeve 62 and having a relatively small diameter is drivingly rotated. Thus, the inertia in the motion converting mechanism 44 is small, so that the motion converting mechanism 44 can smoothly operate.

Constituent elements other than explained above will be explained. The present electric brake caliper 10 also has a function of a parking brake. A stopper ring 100 that holds the radial bearing 48 is attached to the outer circumference of the rear end portion of the driving rotary shaft 46 of the electric motor 42. The stopper ring 100 has a plurality of recesses 102 formed over its entire circumference. A plunger 104 of a solenoid type is provided outside the housing 40 of the actuator 24. A rod 106 of the plunger 104 extends into the inside of the housing 40. When the rod 106 protrudes, its distal end comes into engagement with one of the recesses 102 of the stopper ring 100, thereby prohibiting the driving rotary shaft 46 from rotating. For permitting the electric brake caliper 10 to function as the parking brake, the piston 12 is advanced by the electric motor 42 such that the disc rotor 18 is sandwiched by the brake pads 14, 16 with a set force. In this state, the plunger 104 permits the rod 106 to protrude, thereby prohibiting the driving rotary shaft 46 from rotating. Even if the electric current is stopped from being supplied in this state, the set force is maintained and a predetermined magnitude of the braking force is maintained.

As another constituent element, a circuit box 112 is fixed to the rear end of the housing 40 by a fastening member 110. The circuit box 112 houses a circuit board 114 on which drive circuits for supplying the electric current to the electric motor 42 are disposed, an axial thrust force detecting circuit 118, and so on. The axial thrust force detecting circuit 118 is configured to detect the force applied by the piston 12 to the brake pad 16 for pressing the disc rotor 18, based on signals from a load sensor 116 provided between the thrust bearing 74 and the slide member 76. As still another constituent element, a flexible boot 120 is disposed between the front end of the housing 40 and the piston 12 so as to cover the opening at the front end of the housing 40 for preventing dust from entering the housing 40.

Figure 2:
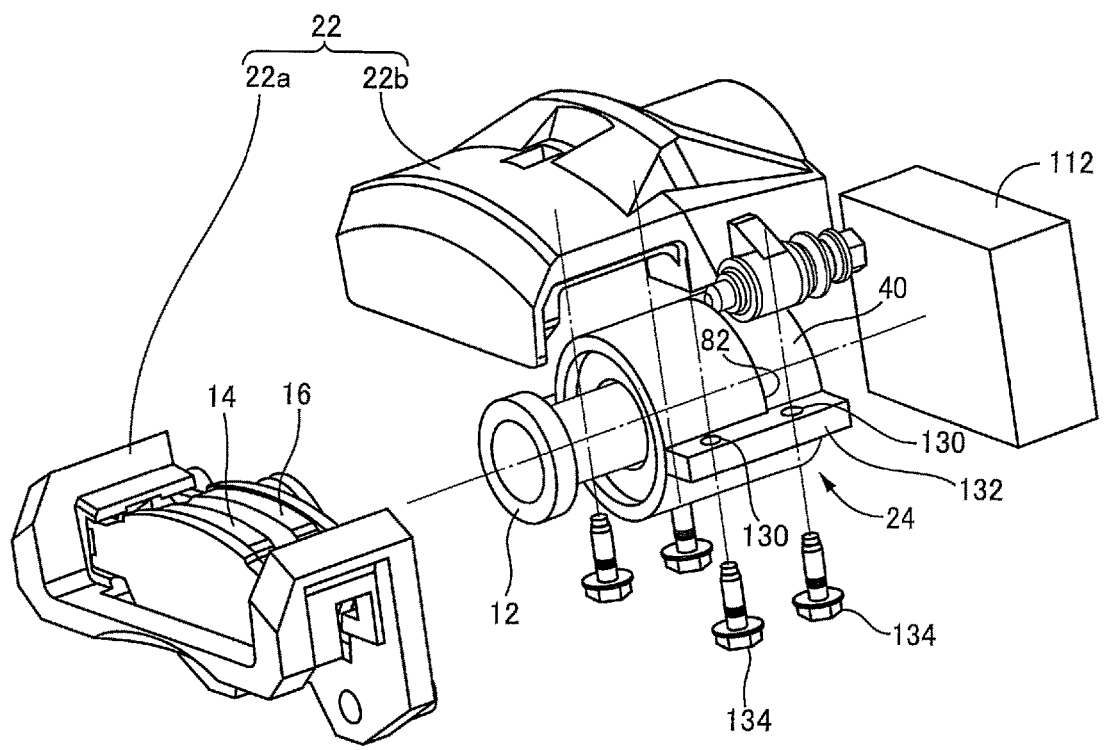
FIG. 2 is a view for explaining that, in the electric brake caliper of the embodiment, an actuator is separable from a caliper main body.

As apparent from FIG. 2, the electric brake caliper 10 is configured such that the actuator 24 is separable from the caliper main body 22 for easy maintenance of the electric brake caliper 10, for instance. The caliper main body 22 is constituted by a front-side member 22a that holds the brake pads 14, 16 and a rear-side member 22b to which the actuator 24 is fixed and the circuit box 112 is attached. The housing 40 of the actuator 24 has a pair of side flanges 132 in each of which two holes 130 are formed. The actuator 24 is fixed to the rear-side member 22b of the caliper main body 22 by bolts 134, each as a fastening member, fitted into the respective holes 130.

As explained above, the counterforce from the brake pad 16 is received by the housing 40 supported by the caliper main body 22. In the electric brake caliper 10 in which the actuator 24 is separable from the caliper main body 22, the stepped surface 82 of the housing 40 and the stepped surface 84 (hidden in FIG. 2) of the caliper main body 22 which are held in contact with each other are effective for receiving the counterforce.

What is claimed is:
1. An electric brake caliper, comprising:
a caliper main body;
a pair of brake pads held by the caliper main body such that the brake pads face each other with a disc rotor interposed therebetween, the disc rotor being configured to rotate with a wheel; and
an actuator held by the caliper main body and comprising (A) a piston, (B) an electric motor of a rotary type as a drive source, and (C) a motion converting mechanism to move the piston by rotation of the electric motor, the actuator being configured to move one of the brake pads toward the other of the brake pads,
wherein the motion converting mechanism comprises (a) an output sleeve having a hollow cylindrical shape and configured to be linearly moved to move the piston in an axial direction in which an axis of the motion converting mechanism extends, the piston being disposed at one of opposite ends of the output sleeve that is nearer to the one of the brake pads, and (b) an input shaft disposed in the output sleeve along the axis and configured to be rotated by the electric motor, the motion converting mechanism being configured to convert rotation of the input shaft into a linear movement of the output sleeve,
wherein the electric motor comprises a driving rotary shaft having a hollow cylindrical shape,
wherein the motion converting mechanism is disposed in an inner space of the driving rotary shaft, and the input shaft comprises a flange whose outer circumferential end is in mesh with an inner circumferential portion of the driving rotary shaft, wherein the electric brake caliper further comprises an inclination allowing mechanism configured to allow inclination of the motion converting mechanism so as to allow inclination of the axis, and wherein a meshing structure between the outer circumferential end of the flange and the inner circumferential portion of the driving rotary shaft enables rotation of the driving rotary shaft to be transmitted to the flange while permitting a displacement of the flange caused by the inclination of the motion converting mechanism.

2. The electric brake caliper according to claim 1, wherein the input shaft is rotatably supported by the caliper main body to permit the motion converting mechanism to receive a counterforce from the one of the brake pads.

3. The electric brake caliper according to claim 2, wherein the input shaft is supported by the caliper main body at the flange through a thrust bearing.

4. The electric brake caliper according to claim 1,
wherein, when the axis is not inclined, the inner circumferential portion of the driving rotary shaft is in mesh with the outer circumferential end of the flange of the input shaft over a certain width in the axial direction at a plurality of locations on one circumference, and
wherein the inclination allowing mechanism is configured such that a center of the inclination of the motion converting mechanism is located within the certain width.

5. The electric brake caliper according to claim 1,
wherein the inclination allowing mechanism comprises: a seat member which is fixed to the caliper main body and which comprises a seat surface recessed so as to define a part of a spherical surface; and a slide member which supports the input shaft and which slides on the seat surface, and
wherein a center of the spherical surface coincides with a center of the inclination of the motion converting mechanism.

6. The electric brake caliper according to claim 1, wherein the actuator comprises a housing in which the electric motor and the motion converting mechanism are housed, the housing being separably fixed to the caliper main body such that the actuator inclusive of the housing is separably held by the caliper main body.

7. The electric brake caliper according to claim 6,
wherein the input shaft is rotatably supported by the housing to permit the motion converting mechanism to receive a counterforce from the one of the brake pads, and the housing is supported by the caliper main body to permit the caliper main body to receive the counterforce, and
wherein the housing comprises a stepped surface and the caliper main body comprises a stepped surface that face each other, the counterforce being received by the caliper main body via the stepped surfaces.

8. An electric brake caliper, comprising:
a caliper main body;
a pair of brake pads held by the caliper main body such that the brake pads face each other with a disc rotor interposed therebetween, the disc rotor being configured to rotate with a wheel; and
an actuator held by the caliper main body and comprising (A) a piston, (B) an electric motor of a rotary type as a drive source, and (C) a motion converting mechanism to move the piston by rotation of the electric motor, the actuator being configured to move one of the brake pads toward the other of the brake pads, wherein the motion converting mechanism comprises (a) an output sleeve having a hollow cylindrical shape and configured to be linearly moved to move the piston in an axial direction in which an axis of the motion converting mechanism extends, the piston being disposed at one of opposite ends of the output sleeve that is nearer to the one of the brake pads, and (b) an input shaft disposed in the output sleeve along the axis and configured to be rotated by the electric motor, the motion converting mechanism being configured to convert rotation of the input shaft into a linear movement of the output sleeve, wherein the electric motor comprises a driving rotary shaft having a hollow cylindrical shape, wherein the motion converting mechanism is disposed in an inner space of the driving rotary shaft, and the input shaft comprises a flange whose outer circumferential end is in mesh with an inner circumferential portion of the driving rotary shaft, wherein the electric brake caliper further comprises an inclination allowing mechanism configured to allow inclination of the motion converting mechanism so as to allow inclination of the axis, wherein the inclination allowing mechanism comprises: a seat member which is fixed to the caliper main body and which comprises a seat surface recessed so as to define a part of a spherical surface; and a slide member which supports the input shaft and which slides on the seat surface, and wherein a center of the spherical surface coincides with a center of the inclination of the motion converting mechanism.

9. The electric brake caliper according to claim 8, wherein the input shaft is rotatably supported by the caliper main body to permit the motion converting mechanism to receive a counterforce from the one of the brake pads.

10. The electric brake caliper according to claim 9, wherein the input shaft is supported by the caliper main body at the flange through a thrust bearing.

11. The electric brake caliper according to claim 8,
wherein, when the axis is not inclined, the inner circumferential portion of the driving rotary shaft is in mesh with the outer circumferential end of the flange of the input shaft over a certain width in the axial direction at a plurality of locations on one circumference, and
wherein the inclination allowing mechanism is configured such that a center of the inclination of the motion converting mechanism is located within the certain width.

12. The electric brake caliper according to claim 8, wherein the actuator comprises a housing in which the electric motor and the motion converting mechanism are housed, the housing being separably fixed to the caliper main body such that the actuator inclusive of the housing is separably held by the caliper main body.

13. The electric brake caliper according to claim 12,
wherein the input shaft is rotatably supported by the housing to permit the motion converting mechanism to receive a counterforce from the one of the brake pads, and the housing is supported by the caliper main body to permit the caliper main body to receive the counterforce, and
wherein the housing comprises a stepped surface and the caliper main body comprises a stepped surface that face each other, the counterforce being received by the caliper main body via the stepped surfaces.

14. An electric brake caliper, comprising:

a caliper main body;

a pair of brake pads held by the caliper main body such that the brake pads face each other with a disc rotor interposed therebetween, the disc rotor being configured to rotate with a wheel; and an actuator held by the caliper main body and comprising (A) a piston, (B) an electric motor of a rotary type as a drive source, and (C) a motion converting mechanism to move the piston by rotation of the electric motor, the actuator being configured to move one of the brake pads toward the other of the brake pads, wherein the motion converting mechanism comprises (a) an output sleeve having a hollow cylindrical shape and configured to be linearly moved to move the piston in an axial direction in which an axis of the motion converting mechanism extends, the piston being disposed at one of opposite ends of the output sleeve that is nearer to the one of the brake pads, and (b) an input shaft disposed in the output sleeve along the axis and configured to be rotated by the electric motor, the motion converting mechanism being configured to convert rotation of the input shaft into a linear movement of the output sleeve, wherein the electric motor comprises a driving rotary shaft having a hollow cylindrical shape, wherein the motion converting mechanism is disposed in an inner space of the driving rotary shaft, and the input shaft comprises a flange whose outer circumferential end is in mesh with an inner circumferential portion of the driving rotary shaft, wherein the motion converting mechanism comprises a plurality of planetary rollers disposed between an outer circumference of the input shaft and an inner circumference of the output sleeve such that the planetary rollers extend in the axial direction and are revolvable about the input shaft, wherein threads are formed on the outer circumference of the input shaft, the inner circumference of the output sleeve, and an outer circumference of each of the planetary rollers, and wherein the thread of the input shaft and the thread of each of the planetary rollers are engaged with each other, and the thread of the output sleeve and the thread of each of the planetary rollers are engaged with each other.

15. The electric brake caliper according to claim 14, wherein the input shaft is rotatably supported by the caliper main body to permit the motion converting mechanism to receive a counterforce from the one of the brake pads.

16. The electric brake caliper according to claim 15, wherein the input shaft is supported by the caliper main body at the flange through a thrust bearing.

17. The electric brake caliper according to claim 14, further comprising an inclination allowing mechanism configured to allow inclination of the motion converting mechanism so as to allow inclination of the axis.

18. The electric brake caliper according to claim 14, wherein the actuator comprises a housing in which the electric motor and the motion converting mechanism are housed, the housing being separably fixed to the caliper main body such that the actuator inclusive of the housing is separably held by the caliper main body.

19. The electric brake caliper according to claim 18, wherein the input shaft is rotatably supported by the housing to permit the motion converting mechanism to receive a counterforce from the one of the brake pads, and the housing is supported by the caliper main body to permit the caliper main body to receive the counterforce, and wherein the housing comprises a stepped surface and the caliper main body comprises a stepped surface that face each other, the counterforce being received by the caliper main body via the stepped surfaces.

\* \* \* \* \*